Jan. 2, 1962  M. H. SIRVETZ  3,015,788
MICROWAVE DEVICE

Filed April 13, 1956  2 Sheets-Sheet 1

INVENTOR
MARSHALL H. SIRVETZ
BY Elmer J. Gorn
ATTORNEY

Jan. 2, 1962 M. H. SIRVETZ 3,015,788
MICROWAVE DEVICE

Filed April 13, 1956 2 Sheets-Sheet 2

INVENTOR
MARSHALL H. SIRVETZ
BY Elmer J. Gorn
ATTORNEY

United States Patent Office 3,015,788
Patented Jan. 2, 1962

3,015,788
MICROWAVE DEVICE
Marshall H. Sirvetz, Cambridge, Mass., assignor to Raytheon Company, a corporation of Delaware
Filed Apr. 13, 1956, Ser. No. 578,043
7 Claims. (Cl. 333—24)

This invention relates to ferrite compositions suitable for use in microwave devices, and more particularly, to such compositions having minimum magnetocrystalline anisotropy energy.

The ability of a piece of ferrite to rotate the plane of polarization of electromagnetic energy propagated through it when subjected to a magnetic field along the same axis independently of the direction of propagation of the energy has been used in such microwave devices as gyrators, isolators, or oneway transmission lines. When ferrites are used for such purposes, it is important that the ferrite device introduce as little loss as possible. This loss is from two or more sources. The major portion of this loss varies with the applied static magnetic field, and reaches a relatively high maximum at a certain applied static magnetic field strength. This is due to the so-called ferromagnetic resonance effect. The applied static magnetic field strength at which this maximum loss occurs varies with the frequencies of the applied electromagnetic energy. In general, it occurs at lower magnetic forces as the frequency of the applied energy is reduced. A second source of loss decreases from a maximum value at zero magnetic field to a very small value at the saturating magnetic field. The magnetic field at which this loss disappears is independent of the frequency of the applied electromagnetic field. The combined effect of these two losses is to give a region of minimum loss at static magnetic field values below that for a field giving high losses. As the high losses occur with lower static magnetic fields with decreasing frequency, the region of low loss becomes smaller with reduced applied frequency. This effect can be minimized by using materials that have a low saturation magnetization. However, to obtain the greatest effect on the propagated electromagnetic energy the magnetization must be as high as possible or a greater amount of the ferrite must be used. Other losses introduced by the presence of the ferrite in the electromagnetic field are proportional to the amount of ferrite present and so are increased when a ferrite of this sort is used. Moreover, ferrites that have a low saturation magnetic action usually have low Curie temperatures which means that, when the temperature rises due to increased applied electromagnetic energy, the effect produced by the ferrite is less and becomes increasingly temperature-sensitive, which is undesirable.

From the consideration of the variation of the losses with the applied static magnetic field, it can readily be seen that, for devices designed to operate below the field required for ferromagnetic resonance, a wider useful range of operating frequencies and applied static magnetic fields can be obtained if the range $\Delta H$ of magnetic field intensity over which the highest losses take place were made narrower.

More generally it can be said of practically every type of ferrite device considered in the microwave engineering literature that the quality of the device at low frequencies varies inversely with $\Delta H$. This applies as well to devices operating at and above the field required for ferromagnetic resonance as to those operating below resonance. Thus at low frequencies the performance of microwave devices has hitherto been limited by the value of $\Delta H$ obtained in available ferrite materials. This range $\Delta H$ of magnetic field intensities is dependent on the magnetocrystalline anisotropy.

Experimentally, this anisotropy is best observed in single crystals of ferrites where the value of the field required for resonance is found to depend on the orientation of the crystallographic axes with respect to the applied static field. In the mathematical theory of this effect, anisotropy is expressed by including in the energy of magnetization a series of terms depending on the orientation of the magnetization, relative to the crystal axes. The first order term is proportional to an anisotropy coefficient $K_1$; the second, to another such constant, $K_2$, and so forth. Frequently, but not always, the $K_1$ term is very large compared to the higher order terms, and they may be neglected. In the single crystals it is observed that the resonance region is very narrow compared to those found for polycrystalline materials. It is moreover observed, and is explainable on the basis of the above theory, that the static field required for resonance varies over a range of the order of $K/M_s$ when resonance is observed for all possible orientations of the crystal. Here K is the anisotropy coefficient in ergs/cm.$^3$, $M_s$ is the saturation magnetization in c.g.s. units, so that $K/M_s$ is expressed in oersteds. In polycrystalline ferrites, which may be considered as collections of crystallites oriented in all directions, one thus observes a broadening of the resonance region, relative to that for a single crystal, of the order of $K/M_s$.

Single crystal ferrites could obviously be used to obtain the advantageous narrow resonance region. However, single crystal ferrites are not readily available commercially. Thus, it is necessary to obtain the same effect with sintered ferrites.

In general this can be accomplished by working with ferrites of low Curie temperature, since K vanishes near the Curie temperature more rapidly than does $M_s$. However, in this case one incurs the disadvantages mentioned above, such as low saturation magnetization, poor high power performance, and temperature sensitivity. In the compositions which are the subject of this invention substantially no decrease in Curie temperature is obtained.

It has been shown by such articles as that by E. W. Gorter entitled "Some Properties of Ferrites in Connection with Their Chemistry" in the Proceedings of the I.R.E. for December 1955, vol. 4, page 1945, et. seq., that ferromagnetic resonance may be pictured as a process in which a coherent motion of the elementary magnetic moments on the ions on identical lattice sites takes place. From this picture it may be deduced that, if these lattice sites could be occupied by two different types of ions such that a change in the direction of magnetization produced an increase in the energy of the magnetic moments associated with one set of ions, which is exactly compensated for by a decrease in the energy of the other set of moments, then the total energy would be independent of orientation and there would be effectively a body of zero anisotropy.

For this, two ferrites having anisotropy energy of the same kind, i.e., having the same form of dependence on orientation, but opposite sign are needed. In most cases, $K_1$ is much greater than $K_2$, and only the $K_1$'s need be of opposite sign. The positive ions, divalent and trivalent, should occupy the same lattice sites in the two ferrites, that is, both should be normal spinels, or both should be inverse spinels. Ferrites may be represented by the formula $MOFe_2O_3$, with $M^{++}$ representing any one of a number of divalent ions, as $M=Ni$, Co, Zn, Mn, and so forth. Still more general formulae may be considered, but the above suffices for this discussion. The spinel ferrite crystal lattice can be represented as made up of a series of cubic units with the positive metal and negative oxygen ions arranged in patterns such that the oxygen (negative) ions form either tetrahedral or octahedral patterns about the metal (positive) ions. In the normal spinel-type ferrite, the iron ions are all enclosed in octahedral patterns of oxygen ions, and the second metal M ions are all associated with tetrahedral patterns of oxygen ions. In the inverse spinel type, half of the iron ions are in tetrahedral positions, and the rest of the iron ions and all of the second metal ions are in octahedral positions. The nature of the M material in part determines the anisotropy coefficient $K_1$. It has been found that while most of the metal ions tested give a negative $K_1$, cobalt gives a positive, and in magnitude very large, $K_1$. The negative $K_1$ of a metal M can be counteracted by the positive $K_1$ of a metal M' when ferrites made of oxides of these metals are combined in such proportions as to give a ferrite with the formula $$(MO)_{1-\alpha}(M'O)_{\alpha}Fe_2O_3$$

where $\alpha$ and $1-\alpha$ are proportionality factors representing the proportions of the two kinds of metal oxides, which should be approximately in the inverse ratio of the magnitudes of the coefficients of the anisotropy for the two metals. Both ferrites of the mixture should be of the normal spinel lattice pattern, or both should be of the inverse spinel lattice pattern to give the best result. The resulting composite ferrite has an almost zero coefficient of anisotropy and the polycrystalline material has a very narrow resonance region, permitting operation in a relatively much wider region of low loss at lower frequencies than the higher anisotropy ferrites.

Other and further advantages of this invention will become apparent as the description thereof progresses, reference being had to the accompanying drawings wherein.

Figure 1:
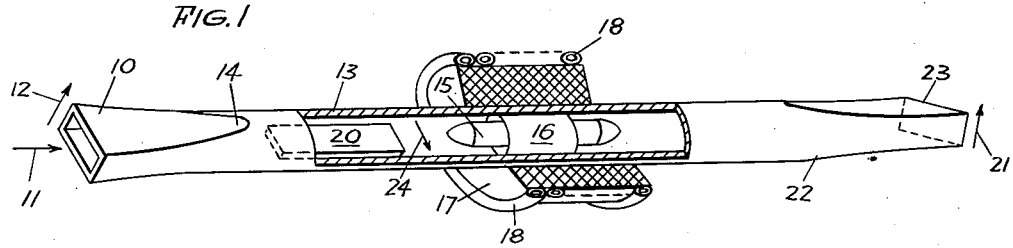
FIG. 1 is an isometric view, partly broken away, of a microwave device utilizing the ferrite composition of the invention.

In FIG. 1 there is shown schematically, a typical microwave device utilizing ferrites; in this case, a rotational isolator. The microwave energy is applied to the rectangular waveguide section 10 in the $TE_{01}$ mode in the direction represented by the arrow 11 with its electrical vector in the direction indicated by the arrow 12. The energy is propagated into a section of waveguide 13 with circular cross section in the $TE_{11}$ mode through a transition section 14 with no change in the direction of polarization. A thin circular rod 15 of ferrite is supported in a dielectric holder 16 formed of a material that presents the minimum discontinuity to the microwave energy. An appropriate axial magnetic field is applied to the ferrite 15 by a coil 17. This magnetic field may also be applied by a permanent magnet or in any other convenient manner. There is mounted in the circular waveguide section 13 before the piece of ferrite 15, a sheet 20 of glossy material, with its longitudinal axis along the axis of the waveguide, and its main transverse axis in such a direction that energy polarized at right angles to the incoming energy will be absorbed, while the incoming energy will pass freely.

In operation, the incident wave has its plane of polarization rotated by 45 degrees from the direction indicated by the arrow 12 by the appropriate choice of the length of the ferrite 15 and the strength of the magnetic field produced by the coil 17 to the direction indicated by the arrow 21 in which polarization it is propagated down the circular sections 13 through a second transition section 22 to a section of rectangular waveguide 23. The sheet 20 of glossy material has no effect on this portion of the energy. Energy coming from the section of rectangular waveguide 23, polarized as shown by arrow 21, has its plane of polarization rotated another 45 degrees so as to be in the direction indicated by the arrow 24, in which polarization it cannot be transmitted by the input section of rectangular waveguide 10 and would be reflected back. The polarization of this reflected energy is such as to cause it to be completely absorbed by the glossy material 20; no part of such energy reaches the input of the device and, hence, the device operates as an isolator. It has the advantage of being a relatively low loss device in the forward direction. Theoretical analysis and experiment show that a device of this type has optimum performance when operated with applied static magnetic field smaller than that required for ferromagnetic resonance.

Figure 2:
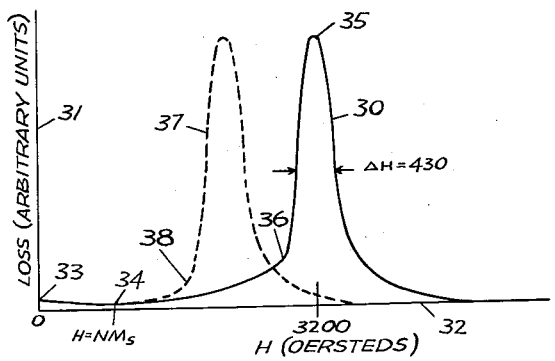
FIG. 2 is a graph of the variation of loss of a representative ferrite with varying applied magnetic fields as measured in a ferromagnetic resonance apparatus.

It is important that this loss in such devices be reduced as much as possible. The solid-line graph 30 in FIG. 2 shows how the loss measured at 10,000 mc./sec., plotted vertically along the line 31, varies with the applied magnetic field strength H, plotted horizontally along the line 32. It will be seen that the loss at no magnetic field, represented by point 33, has a small initial value and decreases with increasing field strength to a minimum at point 34 and then rises with field strength to a maximum at point 35, which in the case of a representative nickel ferrite was found to occur at 3200 oersteds, with a separation $\Delta H$ at points at which the loss is half the maximum value of 430 oersteds. The minimum loss 34 occurs at a magnetic field approximately equal to $NM_s$, where $M_s$ is the saturation magnetization and N, the demagnetizing factor, depends upon the shape of the ferrite and is, in this case, $$\frac{4\pi}{3}$$

The region between point 34 and the beginning of the region of maximum loss is the useful region in which the insertion losses are least. The value $NM_s$ at the point 34 is independent of frequency. However, the maximum at point 35 varies with the frequency of the applied microwave energy, as shown by the dotted curve 37, representing the same ferrite exposed to the same magnetic field strengths but in an electromagnetic field of lower frequency. It is the same as curve 30, except that the resonance region is shifted to the left while the region between 0 field and the beginning of the resonance region tends to remain unchanged, but the low loss region is considerably narrowed and eventually disappears as the curve shifts to the left with lower applied frequency.

Figure 3:
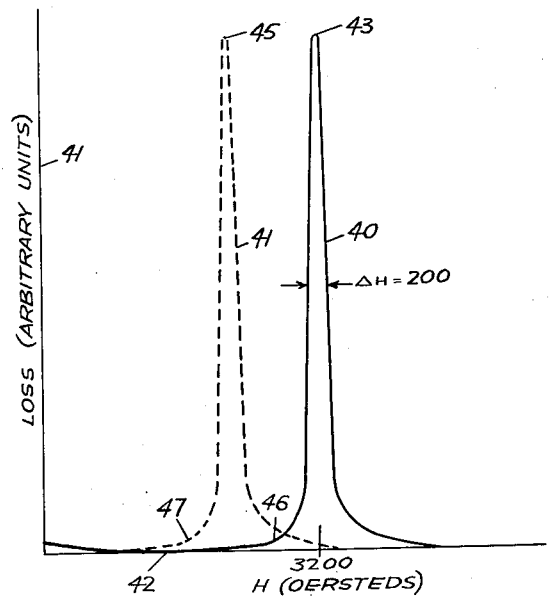
FIG. 3 is a graph on the loss of a ferrite made according to the invention with varying applied magnetic fields as measured in a ferromagnetic resonance apparatus.

The effect of narrowing the resonance region by using single crystals of ferrite, or the sintered-mixed ferrite of the invention, other parameters remaining the same, is shown in FIG. 3, in which solid-line graph 40 again shows the variation of loss plotted vertically along the line 41 with varying applied magnetic field H plotted horizontally along the line 42. The maximum 43 occurs at the same field strength 3200 oersteds, but the width of the region at the half-loss points is narrower, 200 oersteds. The dotted curve 44 shows the effect of lowering the frequency by the same amount, as in FIG. 2. It will be noted that the maximum 45 has shifted to the left as before, but does not encroach as much on the region of low insertion loss between 0 and points 46 and 47 as with the ferrite of FIG. 1.

Figure 4:
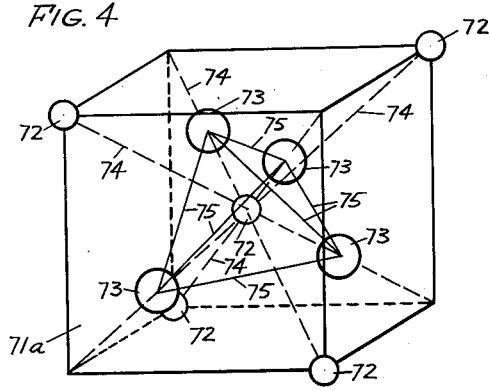
FIG. 4 is a schematic diagram of a lattice of one type of octant making up the unit cells of a normal spinel-type ferrite crystal.
Figure 5:
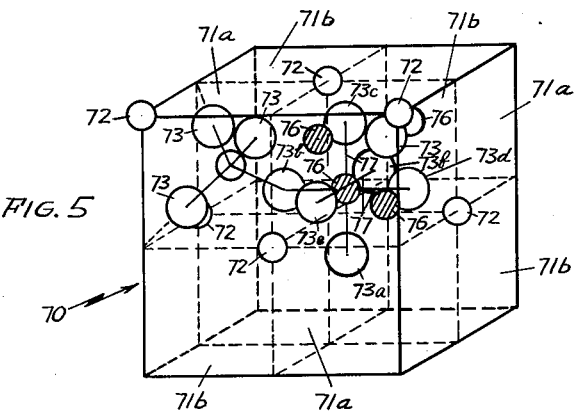
FIG. 5 is a schematic diagram of the lattice of a unit cell of a normal spinel-type ferrite with one octant of each type shown with an ion pattern of each type.

The lattice of a ferrite is of interest here. Such a lattice is of the spinel type and is shown in FIGS. 4 and 5. This lattice may be described by dividing a unit cell, as shown in FIG. 5 and designated by the reference numeral 70, into eight equal cubes, or octants 71. One of these octants is shown in FIG. 4. These octants are of two types. The one shown in FIG. 6 has metallic, or positive ions 72, shown as small open circles at alternate corners of the cube and one at the center. There are four oxygen ions 73, each located on that half of each body diagonal 74 of the cube where the corner is not occupied by a metal ion 72. It will be noted that the four oxygen ions 73 form a tetrahedral about the central metallic ion 72, as indicated by the light lines 75. This metal ion can be said to occupy a tetrahedral position. The other type of octant is shown at the front upper right of the unit cell 70 in FIG. 5. It also has four positive ions 72 on the alternate corners and four negative ions halfway out on the opposite halves of the body diagonals. In addition, there are four positive ions designated by small shaded circles 76. It will be noted that each positive ion 76 of the second type is surrounded by six negative ions 73, forming an octahedron, such as the six ions 73a, b, c, d, e and f, joined by the light lines 77. This is referred to hereinafter as an octahedral position. In a unit cell, such as that shown in FIG. 5, those octants sharing an edge only are of the same type and those sharing a face are of different types. In the unit cell there are enough ions of these types to make up eight molecules of the spinel compound.

In a normal spinel-type of ferrite of the formula $MFe_2O_4$, where M stands for a positive divalent ion, all the tetrahedral positions are occupied by the divalent ions and all the octahedral positions by the iron ions. That is, ions 72 of FIGS. 4 and 5 would be M ions, and the ions 76 would be iron ions. In the inverse spinel lattice, all the tetrahedral positions are occupied by iron ions, and the octahedral positions are shared equally between the two types of positive ions.

Nickel and cobalt oxides are particularly adapted to making the composite ferrites of the invention as they both have the same type of spinel lattice and have Curie points in the same order of relatively high magnitude.

The coefficient of anisotropy $K_1$ of nickel ferrite, $(NiO)Fe_2O_3$ is approximately $-5 \times 10^4$, while that of cobalt ferrite $(CoO)Fe_2O_3$ is approximately $+2 \times 10^6$. Optimum results were obtained when the proportionality factor $\alpha$ was taken as 0.025, giving the formula $(CoO)_{0.025}(NiO)_{0.975}Fe_2O_3$. This is in agreement with predictions based on the single crystal data. The ferrite body of the invention may be prepared by any of the known methods of preparing single ferrite bodies. It will be apparent that this technique is not limited to nickel and cobalt ferrites but can be applied to obtain narrow loss regions in ferrites whenever two single ferrites possessing anisotropy coefficients of opposing sign are mixed in appropriate proportion as described above.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A microwave device including a ferrite having substantially a zero coefficient of anisotropy composed of two ferrites having the same type of spinel crystal structures and coefficients of anisotropy of opposing sign each present in inverse proportion to its coefficient of anisotropy said ferrites consisting of a mixture of CoO and an oxide of one of the elements selected from the group consisting of nickel, zinc, and manganese, which forms ferrites with iron oxide.

2. A microwave device including a ferrite having substantially a zero coefficient of anisotropy composed of two ferrites having the composition of $$NiO\text{---}CoO\text{---}Fe_2O_3$$

having the same type of spinel crystal structures in which the positive ions occupy the same sites, and coefficients of anisotropy of opposing sign each present in inverse proportion to its coefficient of anisotropy.

3. A microwave device including a ferrite having substantially a zero coefficient of anisotropy composed of two ferrites, one of said ferrites composed of a mixture of $Fe_2O_3$ and CoO, and the other composed of $Fe_2O_3$ and an oxide selected from the group consisting of nickel, zinc, and manganese, said ferrites having the same type of spinel crystal structures and coefficients of anisotropy of opposing sign each present in inverse proportion to its coefficient of anisotropy.

4. A microwave device including a ferrite having substantially a zero coefficient of anisotropy having the composition $(MO)\alpha\ (M'O)_{1-\alpha}\ Fe_2O_3$ where M is cobalt and M' is nickel the oxide of which forms a ferrite with iron oxide having a negative coefficient of anisotropy and $\alpha$ is approximately inversely proportional to the coefficient of anisotropy of a ferrite formed with cobalt oxide, $1-\alpha$ is inversely proportional to the coefficient of anisotropy of a ferrite formed with M'O which coefficient is opposite in sign to that of the ferrite formed with MO.

5. A microwave device including a ferrite having substantially a zero coefficient of anisotropy having the composition $(MO)_\alpha\ (M'O)_{1-\alpha}\ Fe_2O_3$ where M is nickel and M' is cobalt the oxide of which forms a ferrite with iron oxide having a positive coefficient of anisotropy and $\alpha$ is inversely proportional to the coefficient of anisotropy of a ferrite formed with nickel oxide, $1-\alpha$ is inversely proportional to the coefficient of anisotropy of a ferrite formed with M'O which coefficient is opposite in sign to that of the ferrite formed with MO, and $Fe_2O_3$ is an iron oxide.

6. A microwave device including a ferrite having substantially a zero coefficient of anisotropy having the composition $(CoO)_{0.025}\ (NiO)_{0.975}\ Fe_2O_3$.

7. An isolator device for electromagnetic energy, comprising waveguide means for guiding such energy, magnetic means for establishing a magnetic field within said waveguide means, and an insert member within such magnetic field comprising a body of the composition $Ni_{1-x}Co_xFe_2O_4$, in which "$x$" is approximately inversely proportional to the coefficient of anisotropy formed with cobalt oxide and $1-x$ is inversely proportional to the coefficient of anisotropy of a ferrite formed with nickel, which coefficient is opposite in sign to that of the ferrite formed with cobalt, whereby the losses in such isolator device are significantly reduced as a result of the substantially zero magnetocrystalline anisotropy of said insert member.

References Cited in the file of this patent

UNITED STATES PATENTS

| | | |
|---|---|---|
| 1,976,230 | Kato et al. | Oct. 9, 1934 |
| 2,640,813 | Berge | June 2, 1953 |
| 2,656,319 | Berge | Oct. 20, 1953 |
| 2,723,239 | Harvey | Nov. 8, 1955 |
| 2,736,708 | Crowley | Feb. 28, 1956 |

FOREIGN PATENTS

| | | |
|---|---|---|
| 1,071,068 | France | Mar. 3, 1954 |
| 1,086,346 | France | Aug. 11, 1954 |
| 1,091,735 | France | Nov. 3, 1954 |
| 697,059 | Great Britain | Sept. 16, 1953 |
| 717,269 | Great Britain | Oct. 27, 1954 |
| 521,341 | Belgium | Jan. 9, 1954 |
| 524,097 | Belgium | Nov. 30, 1953 |

OTHER REFERENCES

Economos: J. Amer. Ceramics, July 1955, pp. 241–244.

Kawai: J. Soc. Chem. Ind., Japan. vol. 37, Nov. 4, p. 174B.

J. Institute of Electrical Engineers, Japan, November 1937, pp. 4, 5; June 1939, pp. 277, 279, 281.

(Other references on following page)

OTHER REFERENCES

Weil: Comptes Rendus, vol. 234, pp. 1351, 1352 (1952).

Specification Catalog, No. 54, pp. 134–136, pub. by J. T. Baker Chem. Co., Phillipsburg, N.J., April 1954.

Neel: Z. Anorg. Chem., vol. 262, p. 178 (1950).

"Physical Review," vol. 99, No. 6, Sept. 15, 1955, pages 1788–1798.

"Journal of Electronics," vol. 1, No. 1, July 1955, pages 64–77.